United States Patent [19]

Denzin et al.

[11] Patent Number: 5,036,941
[45] Date of Patent: Aug. 6, 1991

[54] DRIVE UNIT FOR A VEHICLE IN A DRIVERLESS TRANSPORT SYSTEM

[75] Inventors: Wolfgang Denzin, Ludwig-Braille-Str. 3, 8000 Muenchen 70; Johann Eichinger, Vaterstetten; Max Simon, Olching, all of Fed. Rep. of Germany

[73] Assignee: Wolfgang Denzin, Munich, Fed. Rep. of Germany

[21] Appl. No.: 441,032

[22] Filed: Nov. 22, 1989

[51] Int. Cl.$^5$ .............................................. B62D 59/04
[52] U.S. Cl. .................................... 180/252; 180/253; 180/65.5
[58] Field of Search .............. 180/252, 253, 237, 65.5, 180/65.6; 188/321.11; 267/179; 403/76, 77, 122, 125

[56] References Cited

U.S. PATENT DOCUMENTS

| | | | |
|---|---|---|---|
| 3,163,250 | 12/1964 | Gibson | 180/253 |
| 3,380,546 | 4/1968 | Rabjohn | 180/65.5 X |
| 3,433,318 | 3/1969 | Packard | 180/65.6 X |
| 3,730,369 | 5/1973 | Kleene | 403/77 X |
| 4,130,172 | 12/1978 | Moody | 180/65.6 |

FOREIGN PATENT DOCUMENTS

| | | | |
|---|---|---|---|
| 621550 | 12/1962 | Belgium | 180/237 |
| 684515 | 7/1966 | Belgium | |
| 2504107 | 10/1982 | France | 180/252 |
| 1587424 | 4/1981 | United Kingdom | |

Primary Examiner—Charles A. Marmor
Assistant Examiner—Victor E. Johnson
Attorney, Agent, or Firm—Flynn, Thiel, Boutell & Tanis

[57] ABSTRACT

A vehicle in a driverless transport system has a drive unit which includes an electric motor, a gearing and a drive wheel with a common axis of rotation, is supported on the underside of the vehicle for pivotal movement about a vertical axis of rotation by a ring bearing, and serves only the driving and steering, the vehicle traveling on separate support wheels. A substantially horizontal bracket projects from both sides of a housing of the motor or gearing parallel to a plane of rotation of the drive wheel, one end of the bracket being supported for pivotal movement about an axis directed parallel with respect to the common axis of rotation on an arm extending downwardly from a support plate supported by the ring bearing, the other end of the bracket being supported with respect to the ring bearing by a substantially vertically acting spring arrangement pivotally supported on the bracket and/or the support plate. The spring arrangement can include an arrangement for changing the spring tension.

11 Claims, 3 Drawing Sheets

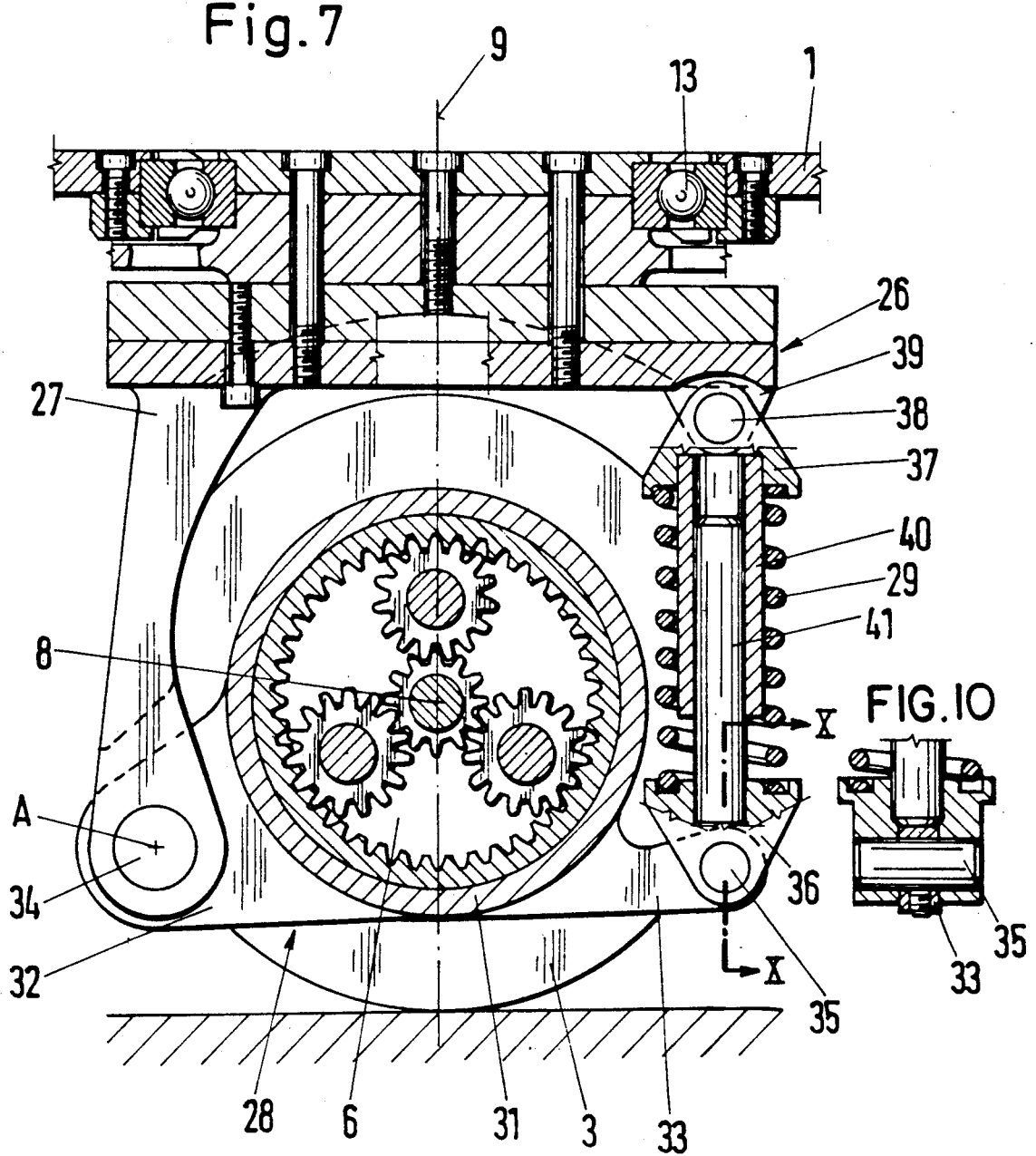

DRIVE UNIT FOR A VEHICLE IN A DRIVERLESS TRANSPORT SYSTEM

FIELD OF THE INVENTION

This invention relates to a drive unit for a vehicle in a driverless transport system and, more particularly, to such a vehicle in which the drive unit includes an electric motor, a gearing and a drive wheel with a common axis of rotation, is supported for pivotal movement about a vertical axis by a ring bearing on the underside of the vehicle, and facilitates only driving and steering of the vehicle, the vehicle traveling on separate support wheels.

BACKGROUND OF THE INVENTION

A height adjustment relative to the undercarriage must be possible for the drive unit in vehicles of the mentioned type, in order to guarantee at a ground unevenness that the ground contact of the drive or steering wheel is maintained with a sufficient pressure. Drives have already been designed in which the drive or steering wheel is supported on a movable bracket and is spring-suspended to an extent corresponding with the necessary height adjustment. Three such known devices are illustrated in FIGS. 1 to 3. All have the disadvantage that a vertical and position-neutral guiding is not guaranteed for the drive or steering wheel in the area of the height adjustment, which guiding, however, is absolutely necessary for good driving behavior. A further disadvantage of the embodiments according to FIGS. 1 and 2 is the relatively great physical height, and furthermore the relationship $Y:Y'>1$ must be viewed as very unfavorable (Y identifying the distance of the bracket pivot point from the ground and Y' identifying the radius of the drive or steering wheel). With its shorter physical height and a relationship of $Y:Y'=1$, the embodiment according to FIG. 3 does not have these disadvantages, but that suspension system, which must also participate in the steering movement, is over-regulated.

An object of the invention is to eliminate these disadvantages of known designs by providing a drive unit of the mentioned type which is constructed so that its guide makes possible in the range of the movement necessary for the height adjustment a most extensive vertical and position-neutral shifting, during which any kind of canting and thus wedging or clamping is impossible, and so that the entire unit has a relatively small physical height.

SUMMARY OF THE INVENTION

This purpose is attained with a drive unit of the general type discussed above, which has next to the drive wheel and below the common axis of rotation a substantially horizontally extending bracket projecting parallel to a direction of travel (i.e. parallel to a plane of rotation of the drive wheel) from both sides of the gearing and/or motor housing, one end of the bracket being supported for pivotal movement about an axis directed parallel with respect to the common axis of rotation on an arm extending downwardly from a support plate of the drive unit pivotally supported by the ring bearing, and the other end of the bracket being supported relative to the ring bearing by a substantially vertically acting spring arrangement which is pivotally coupled to the bracket and/or to the support plate. The advantages of the inventive design consist in particular in that, with a low physical height, a vertically extending and canting-free height adjustment of the drive or steering wheel is guaranteed during travel over a ground unevenness.

BRIEF DESCRIPTION OF THE DRAWINGS

The invention will be described in detail hereinafter in connection with the exemplary embodiment illustrated in the drawings, in which:

FIG. 7 is a fragmentary side view of an alternative embodiment of the drive unit of FIG. 4;

FIG. 10 is a sectional view taken along line X—X in FIG. 7.

DETAILED DESCRIPTION

Figure 5:
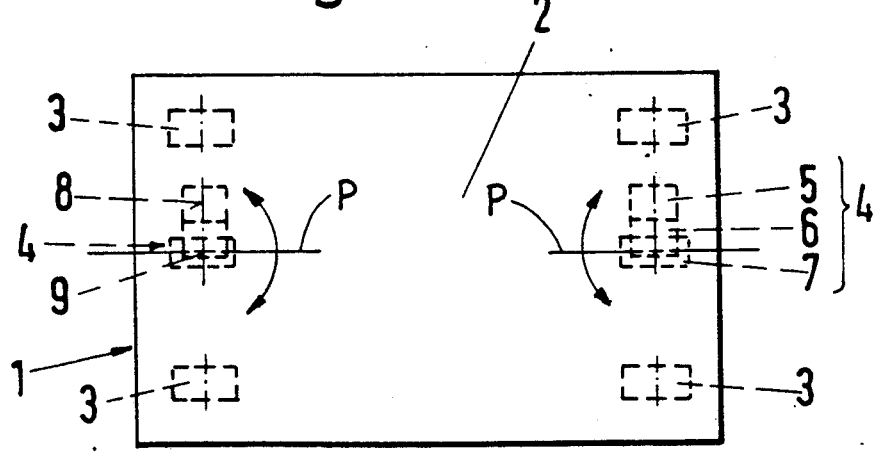
FIG. 5 is a diagrammatic top view of a vehicle of a driverless transport system, showing the arrangement of drive units thereon.

Driverless transport systems are often utilized in large-scale production facilities, for example for transporting workpieces to or from production equipment, or as a carrier for machinery running through several assembly stations. Such a vehicle 1 (FIG. 5), having a not-illustrated design adapted to a particular use or having a loading surface 2, run on four wheels 3. In addition, one or two drive units 4 are provided which, like the wheels 3, are arranged on the underside of the vehicle. The drive unit 4 is supported for pivotal movement about a vertical axis 9 by a ring bearing, and includes an electric motor 5, a gearing 6, and a wheel 7 which is simultaneously used to drive and steer the vehicle 1. During travel over ground unevennesses, one of the four wheels 3 can be without ground contact, but this must not happen for the drive or steering wheel 7, since the vehicle would otherwise stop or could roll out of the provided track. The drive or steering wheel 7 is therefore movably supported and equipped with springs to facilitate the necessary height adjustment of wheel 7. Known spring systems are illustrated in FIGS. 1 to 3.

A bracket 11 (FIG. 1) is supported pivotally about a horizontal axis A on the underside of the vehicle 1 and is resiliently supported relative to the vehicle by means of one or several springs 12. The bracket 11 supports at its underside one ring of a ring bearing 13, the other ring of which is arranged on a support plate 14 secured to the drive unit 4. The motor 5, the gearing behind the motor (and covered by it in FIG. 1), and the drive or steering wheel 7 are, as in the other embodiments, arranged coaxially with a common axis 8. The pivot axis A is always positioned parallel with respect to the axis 8. During travel over ground unevennesses, the bracket 11 carries out a pivoting movement about the axis A in a clockwise or counterclockwise direction, depending on a dip in the ground or an elevation of the ground. In the first case, the springs 12 are relaxed, whereas in the second case they are compressed. The entire spring path must be sufficiently long so that the necessary height adjustment of the drive or steering wheel 7 is assured. Furthermore, the springs must be designed such that the drive or steering wheel is always pressed with the necessary pressure against the ground without the situation arising that, when the springs 12 are compressed, the wheels 3 adjacent to the drive unit are lifted.

Figure 1:
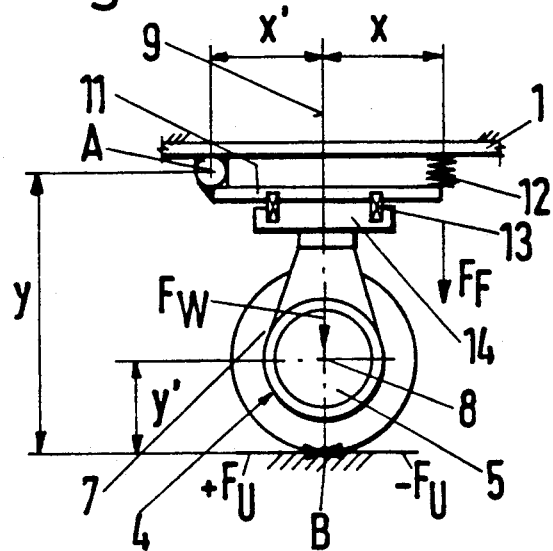
FIG. 1 is a diagrammatic side view of a known drive unit for a vehicle of a driverless transport system.
Figure 2:
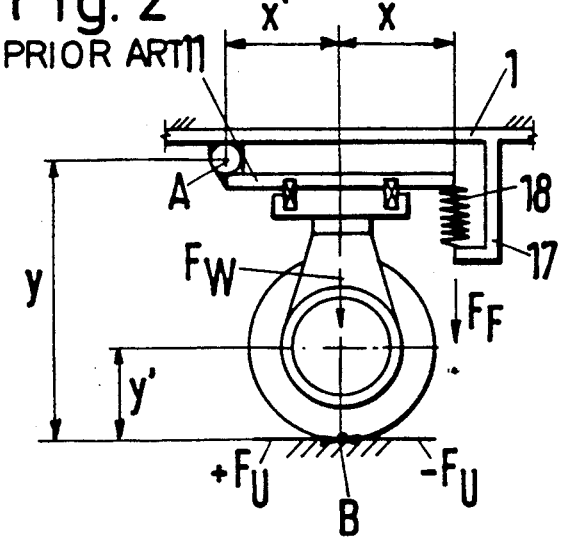
FIGS. 2 and 3 are views similar to FIG. 1 depicting two further known drive units.

In the embodiment according to FIG. 2, the design of the drive unit and its support on the vehicle correspond entirely with the embodiment according to FIG. 1, except that the spring is arranged differently. An arm 17 extending downwardly is mounted on the vehicle 1. The arm 17 extends to a location below the bracket 11, which is resiliently supported with respect to the arm 17 by one or several tension or expansion springs 18. This embodiment provides more space for the springs, so that the design of the spring characteristic is simpler. On the other hand, using expansion springs is not without problems.

Figure 3:
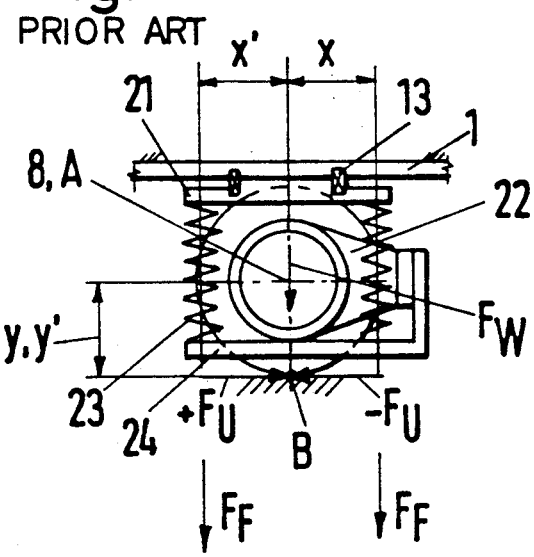

The ring bearing 13 is, in the embodiment according to FIG. 3, arranged between the vehicle 1 and a support plate 21. The drive unit is equipped with a bracket 22 which extends away from the axis 8 of the drive unit in (or against) the direction of travel, which is bent twice, and which extends at 24 under the drive unit. Compression springs 23 are arranged between the support plate 21 and the arm 24 of bracket 22 which extends under the drive unit, and on both sides of the motor 5 or the gearing. The pivot axis A here is coaxial with the axis 8.

Each of these drive units is pivoted about the axis 9 for steering, for which purpose a not-illustrated chain, which is moved by a steering mechanism disposed in the vehicle, is secured to the support plate 14 or 21. Such steering mechanisms are known, for example from U.S. Pat. No. 4,616,730, so that they do not need to be discussed in detail here.

Figure 4:
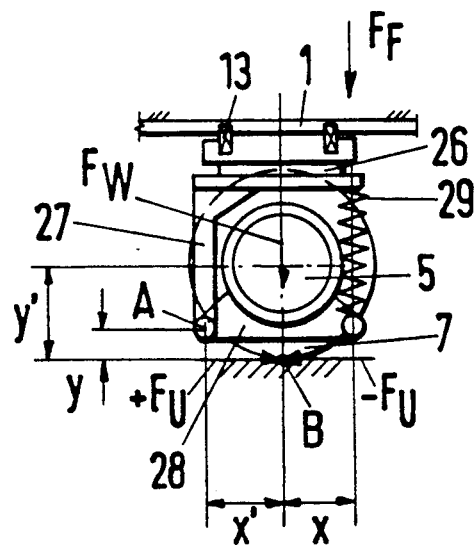
FIG. 4 is a diagrammatic side view of a drive unit embodying the present invention.

The inventive design of a drive unit is shown in FIG. 4, namely in a diagrammatic illustration similar to FIGS. 1 to 3. One ring of the ring bearing 13 is secured on the underside of the vehicle 1, and the other ring is arranged on a support plate 13. An arm 27 is secured to and extends downwardly from the support plate 26, namely, viewed in the direction of travel, in front of or behind the drive unit. One end of a bracket 28 is pivotally supported (at pivot axis A) on the lower end of the arm 27. At the other end of the bracket 28, which approximately in its center is fixedly and non-rotatably connected to the housing of the motor 5 and/or the gearing 6, the bracket 28 and thus the entire drive unit is resiliently supported by one or several compression springs 29 with respect to the support plate 26.

The bracket 28 extends parallel to the plane of rotation P (FIG. 5) of the drive wheel 7.

Compared with the known designs of FIGS. 1 to 3, the axis of rotation A in the inventive design according to FIG. 4 is chosen such that the restoring force $F_u$ occurring on the periphery of the drive wheel 7 during braking or acceleration becomes very small, namely independent from the direction of travel. This arrangement of the axis of rotation A prevents a so-called "pitching" of the drive wheel 7, that is, a lifting of the drive wheel off from its track. If the axis of rotation A were at the same level as the point of contact B of the drive wheel 7 with the track, then the restoring force $F_u$ would be reduced to the value zero.

Aside from the restoring force $F_u$, still other forces act onto the drive wheel 7, namely the spring force $F_F$ of the spring 12, 18 or 29, and the so-called "effective ground bearing force $F_w$". It is generally valid that the sum of the moments caused by said forces is supposed to be zero or less or, stated mathematically, $$\Sigma M = -F_F(X+X') - F_w \cdot X' \pm F_u \cdot Y \leq 0,$$

with counterclockwise moments having a positive sign and clockwise moments a negative sign.

By comparing the lengths of the lever arms in FIGS. 1 to 4, one can see that in FIGS. 1 to 3, at least one lever arm is longer than in FIG. 4, and thus less favorable because, as already mentioned, when the length of the lever arm Y goes toward zero, then the product $F_u \cdot Y$ also goes toward zero, which frees the system from restoring forces. In contrast, if the length of lever arm Y would extend infinitely, the drive wheel would lift off from the track during either braking or acceleration, depending on the direction of travel.

Figure 6:
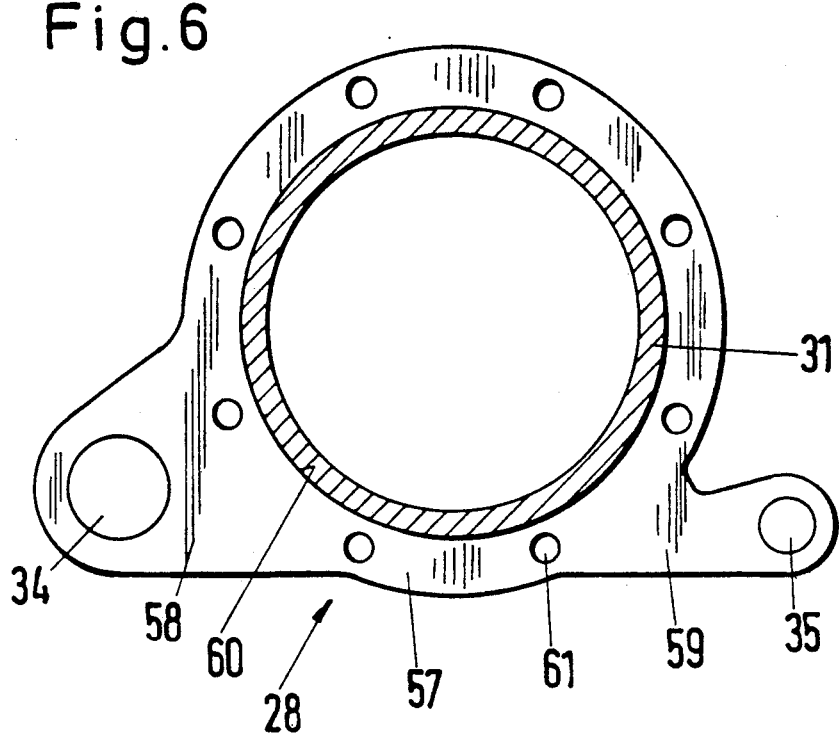
FIG. 6 is a side view of a bracket which is a component of the drive unit of FIG. 4.

FIG. 6 shows one of the different possible embodiments for the bracket 28, namely a disk-shaped structural part 57 having two shoulders 58 and 59, said structural part 57 receiving in a bore 60 therethrough the housing of the motor 5 or of the gearing 6 and being coupled by screws extending through bores 61 to the housing. The bracket is pivotally supported at the shoulder 58 by means of a pin 34, and a not-illustrated spring washer (similar to washer 36 in FIG. 7) is pivotally coupled to the shoulder 59 by means of a pin 35, which will be discussed later on.

FIG. 7 shows another design of the bracket 28, which is simpler with respect to its manufacture, and shows the arrangement of the spring 29. Two plates 32 and 33 are cast as integral portions of the housing 31 of the gearing 6, of which the plate 32 is pivotally supported on the arm 27 by means of the pin 34. The spring washer 36 is pivotally coupled to the other plate 33 by means of the pin 35. One end of the spring 29 is supported against the spring washer 36. The bracket 28 is thus formed by the housing 31 having the two plates 32 and 33 thereon. The other end of the spring 29 is supported on a spring washer 37 which is pivotally coupled to a nose 39 of the support plate 26 by means of a pin 38. To prevent the spring 29 from bending, a guide pipe 40 is mounted on the spring washer 37, and guide pipe 40 longitudinally slidably receives therein a rod 41 secured on the spring washer 36. The rod 41 and the guide pipe 40 are arranged within the coils of the spring 29 so that only a little radial space exists between the spring and the guide pipe 40.

Figure 8:
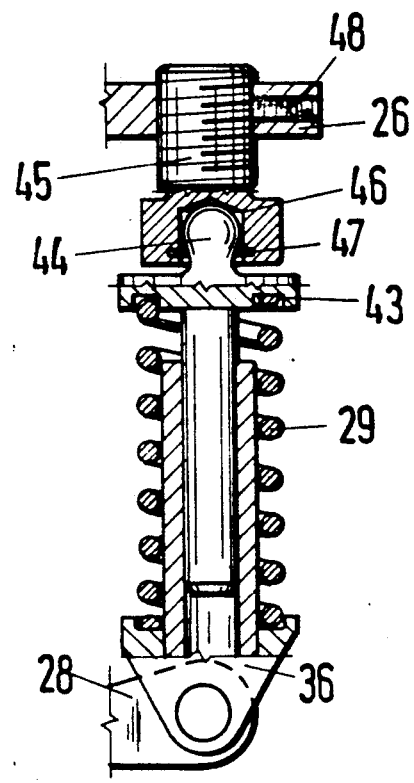
FIGS. 8 and 9 are fragmentary side views illustrating respective variations of a spring arrangement in FIG. 7 which facilitate adjusting of the initial tension of a spring thereof.

It is desirable in various situations for the length or rather the force of the spring 29 to be adjusted. One exemplary embodiment for this is shown in FIG. 8. The spring washer on the support plate 26 is here identified with reference numeral 43. It has a ball-shaped shoulder or portion 44 on its upper side, shoulder 44 extending into a corresponding recess 46 in an adjusting screw 45 which is screwed into the support plate 26, and being secured against slipping out by a snap ring 47. When the adjusting screw 45 is screwed farther into the support plate 26, the spring 29 becomes more relaxed and thus becomes longer. On the other hand, the spring 29 is more strongly initially tensioned when the adjusting screw 45 is screwed less far into the support plate 26. After the spring 29 has been adjusted, the adjusting screw 45 is secured against an unintended adjusting by a setscrew 48 or in another equivalent manner.

Figure 9:
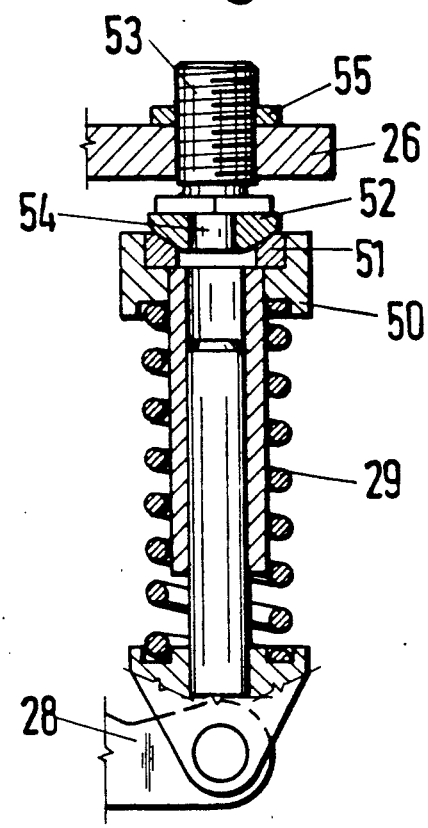

Instead of the aforedescribed embodiment with the ball-shaped shoulder, which is slightly difficult to manufacture, it is also possible to use the embodiment illustrated in FIG. 9, which is based on the principle of a spheric axial bearing. A service-free axial ball-and-socket joint is arranged between the support plate 26 and a spring washer 50, the concave ring 51 of the ball-and-socket joint being received in a recess of the spring washer and the convex ring 52 being supported on a pin 54 of an adjusting screw 53. The adjusting screw 53 functions like the adjusting screw 45. A lock nut 55 is provided here for locking.

The invention is not to be limited to the exemplary embodiments. For example, many modifications are conceivable for the shape of the bracket 28 according to FIG. 6, and also for the type of fastening thereof to the housing of the gearing or motor which, by the way, can also be provided in one common housing. The devices shown in FIGS. 8 and 9 for changing the spring tension can also be provided on the spring washer 36 which is pivotally coupled to the bracket 28.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A drive unit having at least one non-load bearing driven wheel for use on a vehicle movably supported on plural load bearing support wheels, comprising:
   a frame means including first and second frame parts pivotally interconnected about a first horizontally extending axis, said first frame part having a substantially vertically extending portion at a lower end of which is located said first horizontally extending axis, said second frame part extending substantially horizontally away from said lower end of said vertically extending portion and said first horizontally extending axis thereat and parallel to a plane of rotation of said driven wheel;
   bearing means interposed between said vehicle and said first frame part for supporting said frame means for rotation about a vertical axis;
   wheel support means on said second frame part for supporting said driven wheel for rotation about a second horizontally extending axis parallel to said first horizontally extending axis, said first horizontally extending axis being oriented below said second horizontally extending axis, said drive unit further including an electric motor and a transmission means coaxially oriented with said second horizontally extending axis and connected in driving relation to said driven wheel; and
   a substantially vertically extending resilient means connected to and extending between (1) a free end of said second frame part which is remote from and is located on an opposite side of said vertical axis from said first horizontally extending axis and (2) said first frame part for urging said free end of said second frame part away from an upper portion or said first frame part oriented thereabove when a ground surface with which the driven wheel engages becomes oriented beneath a ground surface plane engaged by said load bearing support wheels and for yielding to forces occurring on said driven wheel when the ground surface with which the driven wheel engages becomes oriented above the ground surface plane engaged by said load bearing support wheels.

2. A drive unit according to claim 1, wherein said second frame part is integral with at least one of said electric motor and said transmission means.

3. A drive unit according to claim 1, wherein said second frame part is a separate structural part having means defining an opening therein and at least one of said electric motor and said transmission means is received in said opening and locked against rotation with respect thereto.

4. A drive unit according to claim 1, wherein said resilient means includes a coil spring and guide means for supporting said spring and preventing it from bending, the opposite ends of said coil spring each resting on spring washers respectively pivotally coupled to said free end of said second frame part and to said first frame part.

5. A drive unit according to claim 4, including a ball-and-socket joint means, and wherein at least one of the two spring washers is pivotally coupled through said ball-and-socket joint means to an adjustment means for facilitating a change of the initial tension of the spring.

6. A drive unit according to claim 5, wherein said one spring washer has a ball-shaped shoulder on a side facing away from said coil spring, said shoulder being received in a corresponding socket in an end of an adjusting screw which is vertically adjustably supported on said at least one of said first and second frame parts.

7. A drive unit according to claim 5, wherein said one spring washer has on a side facing away from said coil spring one part of a two-part ball-and-socket joint, the other part of said joint being supported on an adjusting screw which is vertically adjustably supported on said at least one of said first and second frame parts.

8. A drive unit according to claim 1, wherein said second horizontally extending axis is oriented between said first horizontally extending axis and said free end of said second frame part.

9. A drive unit according to claim 1, wherein said first horizontally extending axis is located adjacent a periphery of said driven wheel and on a horizontal plane extending parallel to said second horizontally extending axis oriented a majority of a radius of said driven wheel below said second horizontally extending axis.

10. A drive unit according to claim 9, wherein a juncture of said free end and said resilient means is adjacent a periphery of said driven wheel.

11. A drive unit according to claim 10, wherein said juncture is on said horizontal plane.

* * * * *